July 11, 1933.  J. MARCHESE ET AL  1,917,658
THERMOSTATIC CONTROL DEVICE
Filed July 21, 1930
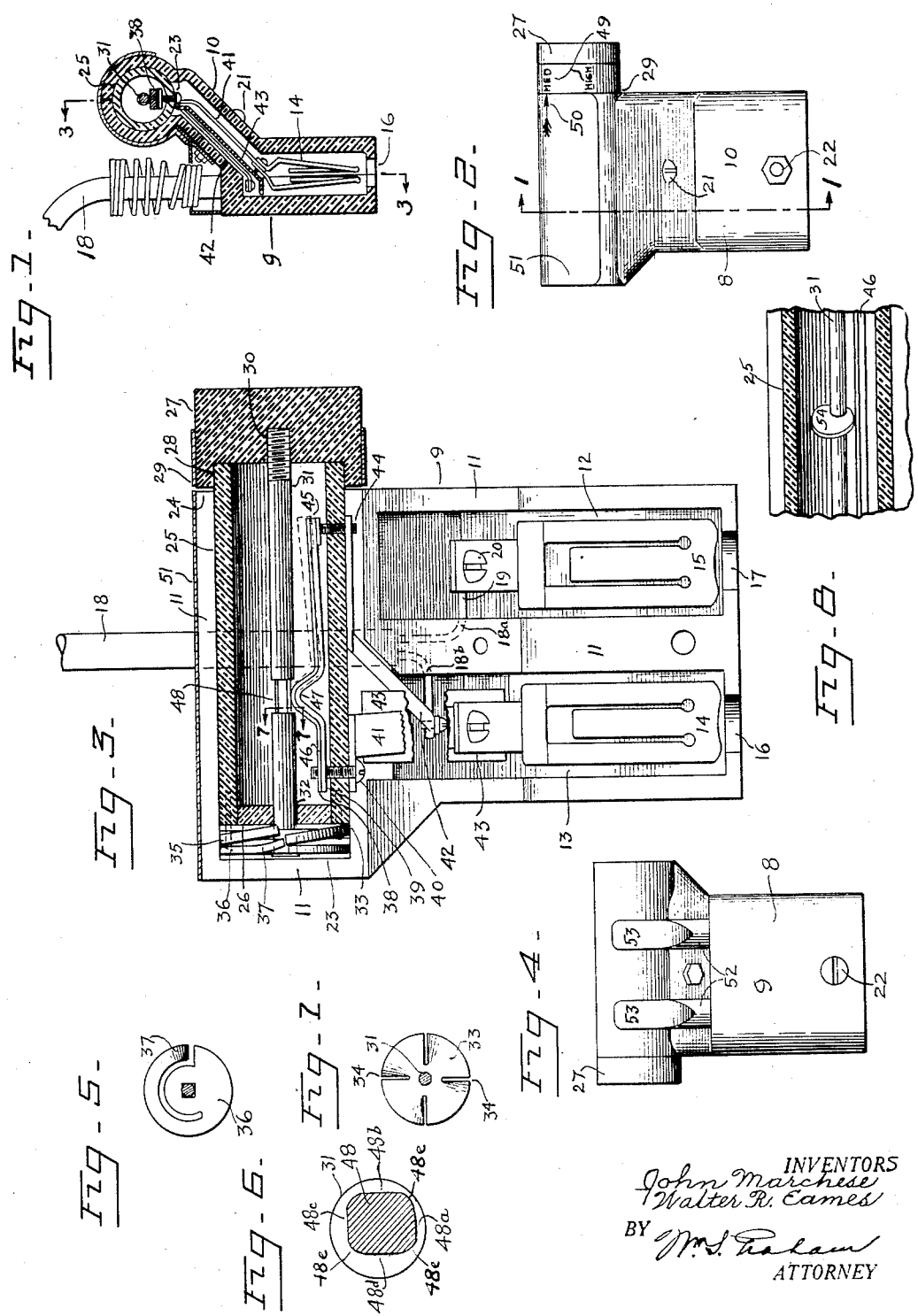
INVENTORS
John Marchese
Walter R. Eames
BY
ATTORNEY Patented July 11, 1933

1,917,658

UNITED STATES PATENT OFFICE

JOHN MARCHESE AND WALTER R. EAMES, OF PORTLAND, OREGON, ASSIGNORS TO GUARDETS INC., OF PORTLAND, OREGON, A CORPORATION OF NEVADA

THERMOSTATIC CONTROL DEVICE

Application filed July 21, 1930. Serial No. 469,292.

This invention relates to thermostatic control devices, and is especially adapted to use with connections or plugs for electrically heated devices, such as irons, percolators, toasters, curlers, etc. These plugs are usually attached to an end of an ordinary double conductor electric wire, which is attached at its other end to a source of electrical energy or current. When the electrically heated device is in operatiton for a considerable period of time under a certain current, it is difficult to maintain a practically uniform temperature in the device. For simplicity and clarity, the invention is illustrated and described herein as applicable to a plug for electric irons, but it is to be understood that the device is equally adaptable to all forms of electrically heated or operated devices and appliances.

It is old to regulate the temperature of such devices by having separate series of electrical resistance coils therein, and providing separate switches whereby the series of coils may be heated either separately or in unison, but this requires manual operation of the switches to regulate the heat of the device. It is desirable that one uniform flow of current be maintained, and to provide for regulation of the temperature of the device by means of a thermostat which is automatically operated by the heat generated within the device.

The objects of the invention are to provide a thermostatic control for a plug connection for electrical devices which is adjustable to effectively operate at varying degrees of heat, and which is sensitive to relatively small changes of temperature; is simple in construction; economical to manufacture, easily assembled for repair or replacement of parts, which has great durability and is so arranged as to be easily accessible for purposes of manipulation while the electrical device is being used; a further object is to provide a thermostat unit independently housed so that it may be adapted to use in electrical connections and plugs of varying forms and for various purposes.

With the above mentioned and other objects in view, the invention consists in the novel construction and combination of parts hereinafter described, illustrated in the accompanying drawing and pointed out in the claims hereto appended; it being understood that various changes in the form, proportion, size and minor details of construction with the scope of the claims may be resorted to without departing from the spirit or sacrificing any of the advantages of the invention.

To more clearly comprehend the invention, reference is directed to the accompanying drawing, wherein—

Fig. 1 is a lateral transverse vertical section on line 1—1 of Fig. 2.

Fig. 2 is a back view in vertical elevation.

Fig. 3 is a vertical front elevation of one of the members forming the body of the plug, showing the thermostat housing in section, being taken on line 3—3 of Fig. 1.

Fig. 4 is a vertical front elevation of a modification of the device adapted for use with a standard type of plug.

Fig. 5 is a plan view of disc, having pawl.

Fig. 6 is a plan of disc ratchet.

Fig. 7 is a transverse section on line 7—7 of Fig 3, enlarged. Fig. 8 is a fragmentary perspective of a modified form of device for varying pressure contact on the bimetal thermostat bar.

Referring more particularly to the drawing, wherein like characters of reference designate corresponding parts, 8 represents a body portion generally, which is preferably of electrical and heat insulating material, formed of a pair of parts which are designated as a front 9 and a back 10, the said parts being matched so that the faces 11 of the edge portions of the respective parts may form a close fit, except at portions which are intended to provide openings, as hereafter described, the front and back being held together by nut and bolt 21 and 22. Recesses 12 and 13 are provided in the body portion, preferably one-half of said recesses being formed in the front 9 and back 10 respectively. Within the recesses 12 and 13 are mounted electrical contacts 14 and 15 of any suitable material which is a conductor of electrical energy, preferably copper, which said contacts have sufficient resiliency to frictionally grip a pair of prongs of the electrically heated device (not shown), said prongs being inserted into the contacts through openings 16 and 17 formed in the body. The body is preferably formed with an offset, as best shown in [...] to provide for connection of an ordinary two wire electric cord 18, one of said wires 18a being fixedly attached to contact [...] at 19, by any suitable means, such as screw 20, the second wire 18b connecting with the other contact in a manner hereinafter set forth.

A chamber 23 is provided in the body, preferably in the offset portion, which chamber is open at one end 24 and is adapted to receive telescopically therein a cartridge-like thermostat housing 25, which is preferably a longitudinal tubular member closed at one end by an end wall 26, the other end of the housing being closed by a finger grip 27 which is mounted as at 28, whereby the finger grip is permitted to rotate on the end of the thermostat housing 25, the finger grip being mounted so that the periphery of the finger grip is in alignment with the outside surface of the body of the plug, as best shown at 29, in Fig. 2 and Fig. 3. Mounted in the finger grip 27, preferably in threaded relationship, as at 30, is a shaft 31 which extends longitudinally through the thermostat housing 25 and has bearing in an opening 32 in the end wall 26, said shaft being rotatable by means of the finger grip.

There may be mounted on the end of the thermostat housing, as by pins 35, as spacer mechanism which, in the preferred form, is a disc 35 of disc shape, and having radial slots 34 therein, the adjacent edges of each slot being offset to form ratchet teeth, as shown in Fig. 3. The shaft 31 may have fixedly mounted thereon, in any suitable manner, a disc 36 which is disposed parallel, abutting the disc 33, and is provided with a pawl 37 which engages the ratchet teeth of the slots 34. Within the housing 25 is mounted a bimetal bar 46 formed of flexible superposed layers 38 and 39, the layer 39 being more susceptible to expansion by heat than the layer 38. This bimetal bar is connected to the contact 14 by means of a screw 40 extending through the housing and engaging an extension 41 of the contact 14.

Connected to the conduit wire 18b is an arm 42 which is insulated from the contact 14 by a sheath of insulating material 43, which arm acts as a conductor of electrical current to a threadably adjustable contact 44 which extends through the housing 25 and is adapted to have intermittent engagement with a normally free end portion 45 of the bimetal bar 46.

Means are provided whereby the bar 46 has varying degrees of pressure transmitted from the shaft 31 when shaft 31 is manipulated by the finger grip 27; or the shaft 31 and the bar 46 may be adjusted so that there is no contact between them and thus completely break the electric circuit through the thermostatic bar. This means may assume a number of forms, one of which is a cam nut 54 on shaft 31, operating on aligned bar 46, as shown in Fig. 8. In the preferred form herein illustrated, the bar 46 is provided with an unaligned portion 47 intermediate its ends and preferably formed radially of the longitudinal axis of the housing 25, so as to contact with the shaft 31 at a recessed portion 48, said portion 48 providing varying degrees of pressure contact between bar 46 and shaft 31 by manual manipulation of said shaft 31. The recesses of the shaft portion 48 provide a substantial rectangle in cross section eccentrically disposed in the cross sectional area of the bar 31, and providing faces 48a, 48b, 48c and 48d, which are connected by rounded corners 48e, so that the shaft may be more easily manipulated relative to the contact with bar 46. On the finger grip 27 are arranged index markings 49, which may have any desired appropriate legend, such as "Off", "Low", "Medium" and "High", or which may have indicated numerically specified degrees of heat, as by a calibrated scale, and which register with an indicator point 50, the pawl and ratchet on the shaft 31 being so arranged and spaced as to cause the index markings to register with the indicator point, accordingly, as it is desired that the bimetal bar shall operate at the predetermined temperatures.

If desired, a shield 51, preferably of aluminum or other heat conducting material, may be mounted as an outside covering of the chambered portion of the body 25.

In Fig. 7 is provided a modification of a plug similar to that herein described, except that prongs 52 are provided which have connection within the body with the contact 13 and the arm 42, the upper prong portions 53 being shaped to be engaged by the ordinary standard commercial type of plug which normally is supplied attached to an electric cord, and thus apply this invention to such standard commercial cord.

When it is desired to operate the electrical device and bring it to a high temperature, the finger grip 27 would be turned so that the index "High", which corresponds with the recess 48d of the bar 31, which being recessed to a lesser degree than the other recessed surfaces, exerts a greater pressure on the bar 46 and engages the normally free end 45 with the contact point 44 until a temperature is created in the electrically heated device which is sufficient to transmit sufficient heat to the bimetal bar to cause the more rapidly expanding layer 39 to cause the flexible portion of the bar to raise and break the circuit from the conduit 18b to the contact 14, as which time the temperature of the electrical device will begin to decrease. When the temperature is thus decreased sufficiently to contract the layer 39, the flexible end of bar 46 will again engage the contact point 44 and thereby restore the electric circuit through contact 14 and again begin to raise the temperature of the electrical device, this make and break of circuit being continued indefinitely.

The same principle of action occurs when the recessed surfaces 48b and 48c are made to exert pressure on the bar 46, but in such case the pressure on the bar is less and therefore it requires a correspondingly lesser temperature to operate the bar 46. When it is desired to break the circuit entirely, the recessed surface 48d is contacted with the bar 46, and this surface being recessed to a greater extent than the other surfaces permits the bar 46 to assume what may be termed a normal position entirely out of engagement with the contact 44, so that the electric circuit is completely broken.

The pressure on the bar 46 may be varied or adjusted by raising or lowering the contact point 44 which is threadably mounted in the housing 25, and also threadably engages the arm 42, so that the positioning of arm 42 is not disturbed by such adjustment. It has been found advantageous to place the bimetal bar within a housing, preferably in spaced relation to and sealed off from the portion of the plug body which contains the contacts 14 and 15, since it provides a chamber in which the temperature is relatively less than in the portion containing the contacts 14 and 15, and thereby permits of the use of an extremely sensitive bar 46 which performs its thermostatic function under conditions of very small changes of temperature; the sealed chamber also prevents atmospheric corrosion or accumulation of foreign matter. It is also desirable that the arm 42 shall be insulated from the contact 14 by a heat resisting material, such as the asbestos sheet 43, in order that the flexible end 45 of the bimetal bar may be made more sensitive to varying temperatures and operate more quickly to make and break a circuit, and thus maintain the temperature of the electrically heated device more uniformly.

We claim:—

1. A heat control plug for electrically heated devices comprising a body provided with a pair of relatively offset portions and a connecting portion therebetween, a pair of electrical contacts mounted in one body portion, one of said contacts adapted for fixed connection to a conductor of an electric circuit, the second contact having make and break connection with said circuit, and a thermostatic bar mounted in the other body portion and connected with said second contact through the connecting body portion whereby said second contact is connected intermittently in said circuit.

2. A heat control plug for electrically heated devices comprising a body provided with a pair of relatively offset portions and a connecting portion therebetween, a pair of electrical contacts mounted in one body portion, one of said contacts adapted for fixed connection to a conductor of an electric circuit, the second contact having make and break connection with said circuit, and a thermostatic bar mounted in the other body portion and connected with said second contact through the connecting body portion, and means for adjusting said thermostatic bar whereby said bar operates at differing degrees of heat.

3. A heat control plug for electrically heated devices comprising a body having a recessed portion for receiving contact members and an offset portion linked in spaced relation thereto, a pair of electrical contacts mounted in the recessed portion, one of said contacts adapted for fixed connection to one conductor of an electric circuit, a chambered housing member mounted in the offset body portion, a thermostatic bar mounted in the chambered housing member and having one portion fixedly connected to the second contact and having a flexible portion with make and break contact in said electric circuit, and a manually rotatable shaft mounted in said housing and having cammed bearing on the thermostatic bar whereby said thermostatic bar may be selectively included in the electric circuit and the thermostatic bar adjusted to operate at different degrees of temperature.

4. A heat control plug for electrically heated devices comprising a body portion, a pair of electrical contacts mounted therein, one of said contacts adapted to fixed connection to one conductor of an electric circuit, a chambered housing member mounted on the body portion and spaced from the portion containing the contacts, a thermostatic bar mounted in the chambered housing member and having one portion fixedly connected to the second contact and having a flexible portion with make and break contact in said electric circuit, and means mounted in said housing and having cammed bearing on the thermostatic bar intermediate the ends thereof and adapted for selectively including the thermostatic bar in the electric circuit and to adjusting the flexibility of the thermostatic bar.

5. In an electrical plug, a thermostat device comprising a closed housing having a pair of spaced electrical contacts extending through the wall thereof, a thermostatic bar mounted in the housing and having one end portion fixedly connected to one of said contacts and having a flexible portion normally free with an end adjacent to and adapted for make and break with the other of said electrisaid contacts, and manually operable means within the housing having cammed bearing on said thermostatic bar intermediate the ends thereof whereby said normally free portion of the thermostatic bar may be selectively contacted with its adjacent contact and adjusted to various degrees of flexibility.

6. As an article of manufacture, a thermostat for electrical connecting devices, which thermostat comprises a housing having a pair of spaced electrical contacts extending through the wall thereof, a flexible thermostatic bar fixedly connected within the housing to one of said contacts and having a normally free end portion adjacent said other contact, a rotatable shaft mounted longitudinally within the housing, said shaft having cammed bearing on said thermostatic bar intermediate the ends thereof, a manually operable finger grip member mounted on said shaft at one end of the housing and a disc ratchet mounted on said shaft at the other end of the housing.

In testimony whereof we have signed our names to this specification.

JOHN MARCHESE.
WALTER R. EAMES.